United States Patent
Roeske et al.

Patent Number: 5,131,430
Date of Patent: Jul. 21, 1992

[54] VALVES

[75] Inventors: Klaus J. Roeske, Beverly Hills; Arthur E. Bishop, Northwood, both of Australia

[73] Assignee: A.E. Bishop & Associates PTY., Limited, Australia

[21] Appl. No.: 803,010

[22] Filed: Dec. 4, 1991

[51] Int. Cl.⁵ .................. F16K 11/076; F15B 13/02
[52] U.S. Cl. .................. 137/625.23; 137/625.24; 91/375 R
[58] Field of Search .............. 137/625.21, 625.22, 137/625.23, 625.24; 91/375 A, 375 R

[56] References Cited

U.S. PATENT DOCUMENTS

| | | | |
|---|---|---|---|
| 3,022,772 | 2/1962 | Zeigler | 91/375 A |
| 3,393,608 | 7/1988 | Saunders | 91/375 A |
| 3,591,139 | 7/1971 | Bishop | 251/367 |
| 4,454,801 | 6/1984 | Spann | 91/375 A |
| 4,561,516 | 12/1985 | Bishop | 91/375 A X |
| 4,877,100 | 10/1989 | Emori | 91/375 A X |
| 5,069,250 | 12/1991 | Emori | 91/375 A X |

Primary Examiner—Alan Cohan
Attorney, Agent, or Firm—Hill, Van Santen, Steadman & Simpson

[57] ABSTRACT

A rotary valve (1) for hydraulic power steering of vehicles with arcuate slots (9,10) in the sleeve (2) and slots (11) in input-shaft (3) of the valve (1) where some of the slots (10) in the sleeve (2) are formed to provide hydraulic fluid return ports (13) axially of the valve (1) between the sleeve (2) and the input-shaft (3) while the axial extent of adjacent sleeve slots (10) and input-shaft slots (11) is the same at their ends remote from the return ports (13).

6 Claims, 4 Drawing Sheets

VALVES

FIELD OF INVENTION

This invention relates to rotary valves and more particularly to rotary valves for hydraulic power steering of vehicles.

BACKGROUND

Typically such valves include an input-shaft, usually connected to the steering wheel of the vehicle by a flexible joint, and having in its outer periphery a plurality of blind ended, longitudinally extending slots separated by lands. Journalled on the input-shaft is a sleeve member having in its bore a similar array of longitudinally extending blind ended slots matching those of the input-shaft, but in underlap relationship thereto, the slots of the one being wider than the lands of the other so defining a set of longitudinally extending orifices which open and close when relative rotation occurs between the input-shaft and the sleeve.

Drilled passages in the input-shaft and sleeve, together with circumferential grooves in the periphery of the sleeve, serve to communicate oil between the slots in the input-shaft and sleeve, an engine driven oil pump, and right-hand and left-hand hydraulic assist cylinder chambers incorporated in the steering gear.

A torsion bar incorporated in the input-shaft serves to urge the input-shaft and sleeve towards a neutral, centred condition when no power assistance is required. When torque is applied by the driver to the steering wheel, the torsion bar deflects, causing relative rotation of the sleeve and from the input-shaft neutral condition, so directing oil to the right-hand and left-hand assist cylinder chambers.

The general method of operation of such rotary valves is well known in the art of power steering design and so will not be described in any greater detail in this specification. An excellent description of this operation is contained in U.S. Pat. No. 3,022,772 (Zeigler), commonly held as being the "original" patent disclosing the rotary valve concept.

The prior art which is most closely related to that of the present invention is as disclosed in U.S. Pat. No. 4,454,801 (Spann) which shows a valve requiring axial rectilinear oil return slots in the internal bore of the sleeve in conjunction with end stop rings, pressed into counterbores at each end of the sleeve, for closing off these slots. The rectilinear slots are arranged circumferentially as alternate feed and return slots, the feed slots being machined sufficiently shallow to allow the end stop rings to hydraulically seal these slots, whereas the return slots are machined relatively deeper to allow oil to return out of the sleeve underneath the end stop rings.

The essence of the present invention resides in the provision of extended arcuate slots in the sleeve for providing an optimum return path for oil exhausting from a valve, in conjunction with the elimination of sleeve end stop rings. The advantages of such a construction over that disclosed in U.S. Pat. No. 4,454,801 (Spann) may arise as one or more of the following:

Firstly, the absence of end stop rings, and the appropriate lack of need of counterbores at each end of the sleeve, means that it is possible to provide a much thinner wall construction to the sleeve, hence reducing its outside diameter for a given inside diameter, and yet still providing sufficient hoop strength to resist the stresses imposed by the hydraulic pressures within the component during operation. Also the length of the sleeve, measured in an axial direction parallel to its bore, is considerably reduced. The reduced outside diameter and length of the sleeve, and corresponding "flow on" in reduction in size of the overall valve and valve housing, leads to considerable reduction in material usage and hence the cost and weight of the overall steering gear.

Secondly, the one piece sleeve construction is inherently more reliable compared to the three piece sleeve configuration of the prior art, there being no end stop rings that may become loose or leak oil. U.S. Pat. No. 3,591,139 (Bishop) clearly specifies the advantages of a one piece sleeve in terms of overall product reliability.

Thirdly, the arcuate cross-section of the oil return slots in the sleeve inherently provides a deep manifold area for gathering oil as it passes through the last metering edges into these slots and yet the oil is forced to flow through sharp edged orifices of relatively smaller cross-sectional area at the point of oil exhaust out of the sleeve.

Such sharp edged orifices can be purposefully used to provide an appropriately small restriction to oil flow exhausting from the sleeve. It has been found that such a restriction placed in the hydraulic circuit immediately after the last metering edge prior to oil return, can have a significant effect on reducing the valve "hiss" noise typically generated by the metering edges of such valves during conditions of maximum operating pressure (e.g. parking manoeuvres). It would appear that this restriction, even though only resulting in an increase in back pressure on the power steering valve of perhaps 30-50 kPa, has a significant effect on reducing oil cavitation as it passes over the valve metering edges. A similar restriction placed further "down" the hydraulic system, that is, closer to the point of final oil return at the hydraulic reservoir, has been shown in experiments to be much less effective in suppressing valve hiss.

As is well known in the art of automotive power steering, valve hiss usually increases in noise level with increase in hydraulic oil temperature due to the corresponding increase in vapour pressure of the fluid. If a restriction in the oil flow in the sleeve was achieved via, for example, a reduced diameter drill hole in the valve return port, the back pressure provided by such a restriction would dramatically reduce with increase in oil temperature due to the aforementioned reduction in oil viscosity. A drill hole, with a length at least twice its diameter, generates back pressure to flow by essentially viscous type energy losses due to the laminar nature of the oil flow in such orifices. Therefore, if a simple drill hole is provided as the oil restrictor, back pressure would be minimum at the temperature when maximum back pressure is actually required to suppress hiss noises.

On the other hand sharp edged orifices, as provided by the extended arcuate return slots in the sleeve, are much less viscosity dependent. That is, they will generate almost a constant back pressure for a given flow rate of oil independent of oil temperature. Sharp edged orifices are generally defined as the class of orifices in which the cross-sectional area of the orifice rapidly reduces in the direction of fluid flow to a minimum area in a single plane normal to the direction of fluid flow and the cross-sectional area rapidly increases thereafter.

The fluid dynamics of sharp edged orifices versus hole or tube type orifices is dealt with at length in such texts as Hydraulic Control Systems by Herbert E. Merritt (John Wiley and Sons, Inc. 1967) and will not be further elaborated on in this patent. The sharp edged orifice is therefore particularly effective as a noise suppressor in power steering valves at high oil temperatures, and such an arrangement is provided at no extra cost or complexity by the geometry of the extended arcuate return slots in the sleeve.

The rectilinear or prismatic oil return slots disclosed in U.S. Pat. No. 4,454,801 (Spann) inherently cannot be used to provide a sharp edged orifice type restriction to oil flow at the point of exhaust from the sleeve. Indeed, in that specification, the construction is specifically aimed at reducing hydraulic back pressure in the power steering valve.

Fourthly, the extended arcuate return slots can be positioned so that they extend out only one end of the sleeve, as opposed to the rectilinear slots which are the subject of U.S. Pat. No. 4,454,801 (Spann). The latter slots necessarily must extend out both ends of the sleeve due to the broaching method used for their manufacture. As is well known in the art of power steering, oil return is normally extracted from only one side of the sleeve, hence the arcuate slots extending out only one end of the sleeve are much more desirable than the functionally redundant arrangement disclosed in U.S. Pat. No. 4,454,801 (Spann).

Another item of prior art which may appear to be relevant to the present invention is the disclosure of U.S. Pat. No. 3,393,608 (Saunders) which contrasts with the present invention by providing extended arcuate slots in the input-shaft for axial oil return in combination with rectilinear slots in the sleeve and appropriate end stop rings. By reason of the input-shaft having axially extended, and therefore relatively deeper, arcuate return slots, there arises a significant reduction in the torsional strength of the input-shaft. This is very important in the fail-safe mode situation where the input-shaft is required to resist the full manual steering torque in the case of a failed torsion bar. The reduced torsional strength of such large diameter input-shafts (typically 22-23 mm diameter) as depicted in U.S. Pat. No. 3,393,608 (Saunders) may have been tolerable due to the significant degree of redundant strength that existed in the design of such components in the 1960's. However axially extended oil return slots in the input-shaft would be totally intolerable from a torsional strength point of view in the modern "mini" style power steering valves which typically have input-shafts of approximately 18-19 mm diameter. From a torsional strength point of view, it is far more beneficial to axially extend slots in the sleeve for oil return since this component is never highly torsionally stressed, even in the fail-safe mode of operation.

U.S. Pat. No. 3,591,139 (Bishop) is similar to the above described U.S. Pat. No. 3,393,608 (Saunders) except that arcuate blind-ended slots are employed in the sleeve. The former arrangement therefore still results in reduced torsional strength of the input-shaft which is of significance in the fail-safe mode of operation as described above.

DISCLOSURE OF INVENTION

In contrast to the teachings of the prior art the present invention consists in a rotary valve comprising an input-shaft journalled within a sleeve, an array of first and second substantially arcuate slots formed in the internal bore of the sleeve, at least one of said first slots being stopped short of the ends of the bore, wherein at least one of the second slots extends to at least one axial extremity of the bore to provide an hydraulic fluid return port, each return port being bounded by the periphery of the input-shaft and its associated second slot and being of the form of a sharp edged orifice, and further wherein the associated first and second slots are of substantially the same axial extent in the axial direction remote from said respective return port.

In an embodiment of the invention the slots are in the form of a segment of a circle wherein the radii of curvature of the second slots are larger than the radii of curvature of the first slots.

In another embodiment the maximum radial depth of the second slots is larger than the maximum radial depth of the first slots.

In a preferred form, the arcuate return slots in the sleeve are manufactured as having a relatively large radius and with a centre of curvature axially displaced compared with the arcuate feed slots. This has the effect of limiting the radial outward depth of penetration of the return slots which are, of course, longer than the feed slots. Sleeves incorporating internal arcuate slots can be readily manufactured in mass production using slotting machines, of the type for example as disclosed in U.S. Pat. No. 4,154,145 (Bishop). A differential slot radius and centre of curvature of the return and feed arcuate slots could be readily achieved in production by double processing the part through two slotting machines. For an eight slot sleeve, for example, the first slotting machine could slot the four long, large radius return slots and the second machine slot the four shorter, smaller radius feed slots.

The response of a rotary valve of the present invention is maximised by maintaining the aforementioned underlap relationship of sleeve slots and input-shaft slots over the entire length of the metering edges of those slots. This is achieved in the present invention by axially aligning the ends of associated sleeve slots and input-shaft slots at their positions remote from their associated fluid return port. Any misalignment of those ends of the associated sleeve slots and input-shaft slots will effectively shorten the metering length of the valve and hence reduce its responsiveness.

BRIEF DESCRIPTION OF DRAWINGS

The present invention will now be described by way of example with reference to the accompanying drawings, in which.

DESCRIPTION OF EMBODIMENTS

Figure 1:
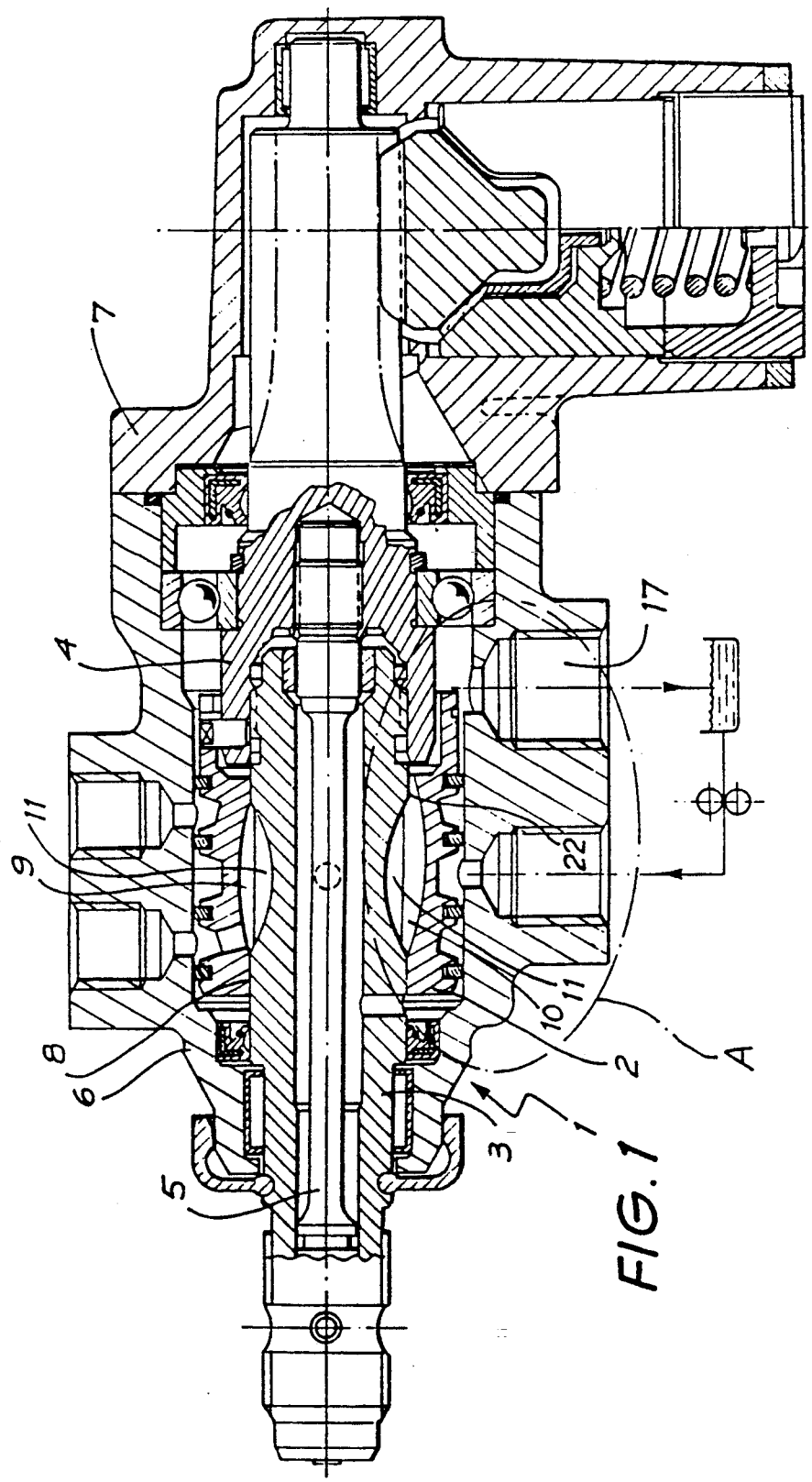
FIG. 1 is a sectional view of a valve assembly formed in accordance with the present invention.
Figure 2:
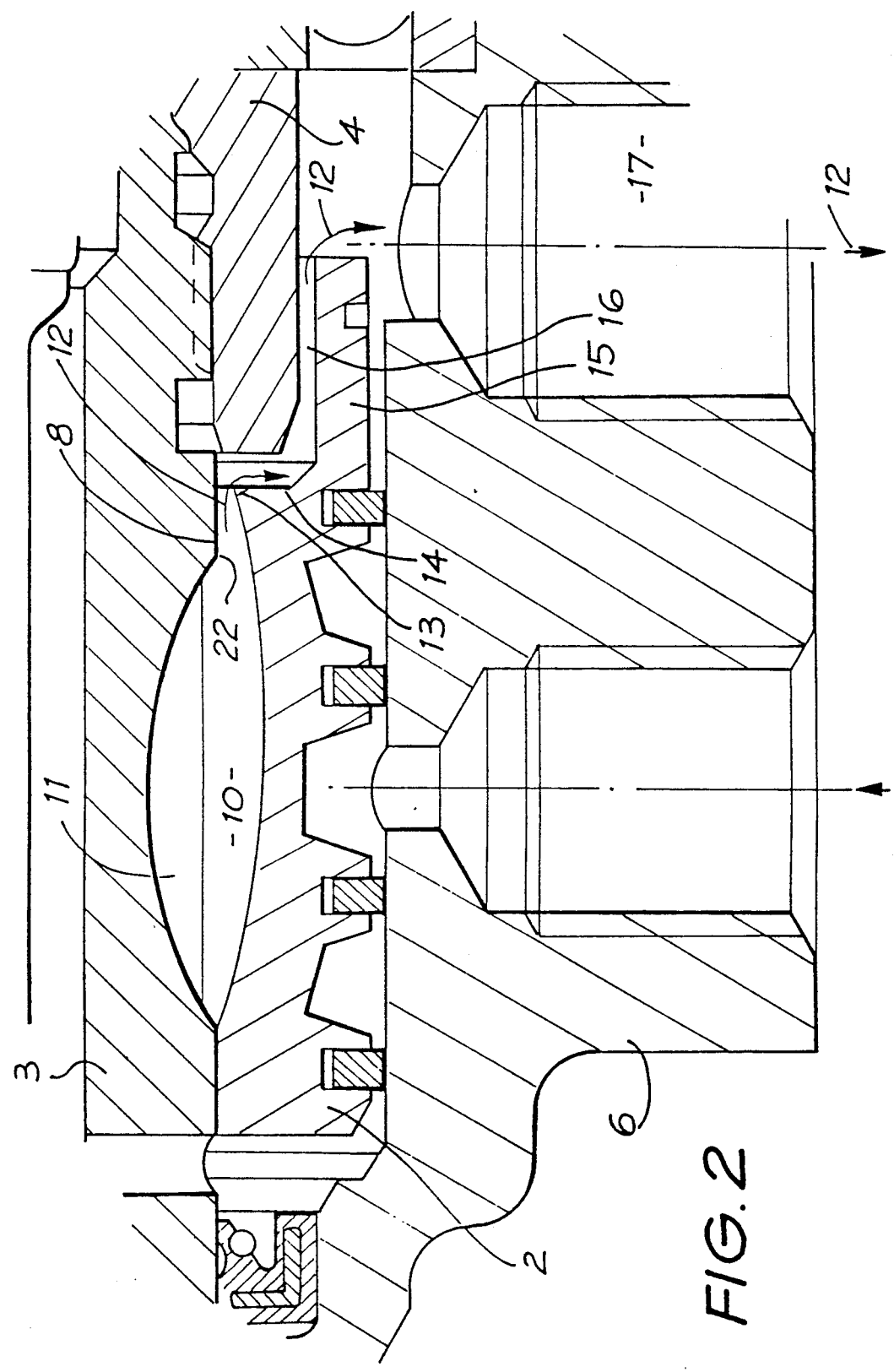
FIG. 2 is a magnification of region A of FIG. 1.

Referring to FIGS. 1 and 2 which show a valve assembly 1 and portion "A" of valve assembly 1 respectively, valve assembly 1 comprises as major components sleeve 2, input-shaft 3, pinion 4 and torsion bar 5, the latter which compliantly connects input-shaft 3 and pinion 4. Together with numerous seals, pins, clips and bearings, valve assembly 1 is contained in valve housing 6 which is bolted to rack and pinion steering gear housing 7.

Only the specific operation of the valve assembly 1 relating to the method of returning oil out of the valve assembly to the hydraulic reservoir is of interest in the present invention. Therefore, as stated earlier, a general description of the method of operation of the valve assembly will not be presented in this specification.

Sleeve 2 is exampled as a six slot design and therefore has circumferentially spaced around its bore 8 three feed slots 9 and three return slots 10. These feed and return slots are alternately interposed between six input-shaft slots 11 in an underlapping relationship according to normal rotary valve practice earlier described.

Feed slots 9 are conventional arcuate blind-ended slots, however arcuate return slots 10 are extended enabling return oil flow 12 to exhaust axially out of sleeve 2 via restrictions at sharp edged orifices 13. Sharp edged orifices 13 are formed as a result of arcuate return slots 10 intersecting the axial extremity 14 of sleeve 2 adjacent to the outside diameter 22 of input-shaft 3 but inside sleeve skirt 15. Return oil flow 12 then proceeds via the large annular cavity 16 separating sleeve skirt 15 and pinion 4, and thence out of the power steering valve housing 6 through return port 22, 13 to oil return passageway 17.

The hydraulic restriction imposed by sharp edged orifices 13 causes a differential pressure to be generated across these orifices as oil passes through them and, therefore, the resulting additional back pressure is imposed on the entire hydraulic circuit prior to these orifices i.e. right back to the hydraulic pump. The sharp edged geometry of these orifices resulting from the arcuate nature of return slots 10, as explained earlier, causes the magnitude of this additional back pressure to be relatively invariant with respect to oil temperature and is therefore an ideal, very low cost method of reducing valve hiss noises which typically occur due to oil cavitation at high temperatures.

It is also seen from FIGS. 1 and 2 that extended arcuate return slots 10 in sleeve 2 are of a larger radius, and have a centre of curvature displaced to the right, compared with arcuate feed slots 9 while maintaining the same axial extent in the direction remote from return port 22, 13. As stated earlier this allows return slots 10 to "break through" the axial extremity 14 of sleeve 2 adjacent to the outside diameter 22 of input-shaft 3 and yet slots 10 are limited to a depth approximately equal to that of feed slots 9. The structural integrity of sleeve 2 is therefore not compromised.

Figure 3:
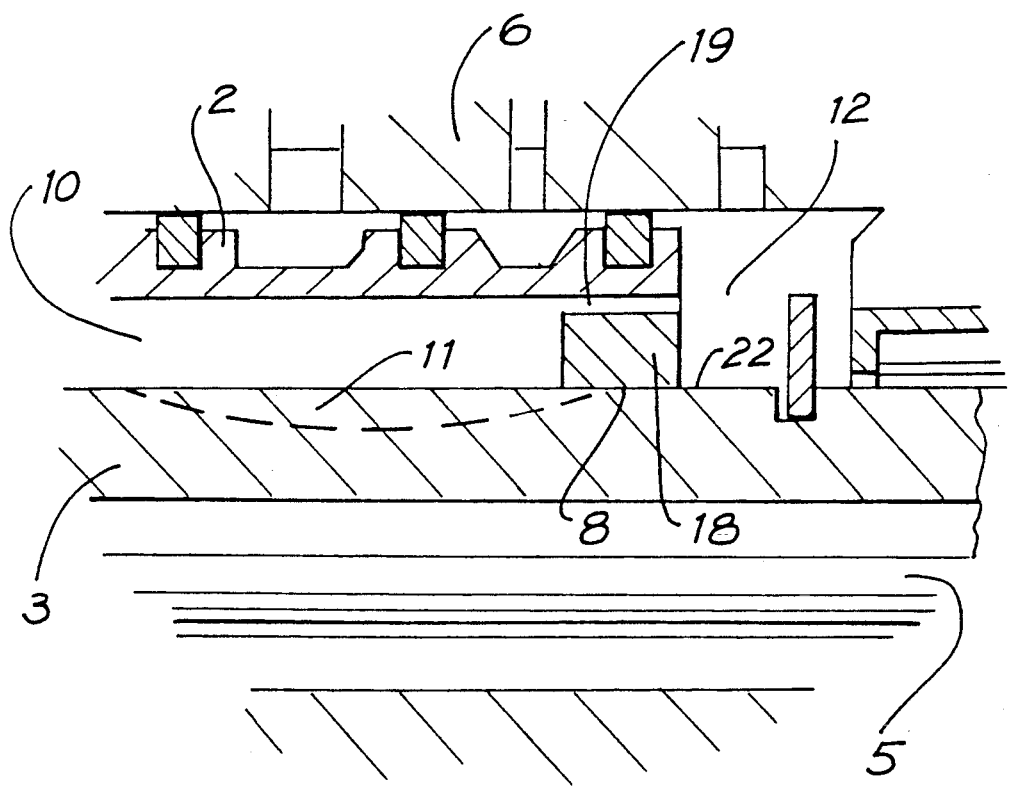
FIG. 3 is a similar view to FIG. 2 but showing the essential characteristic of the invention of U.S. Pat. No. 4,454,801 (Spann)
Figure 4:
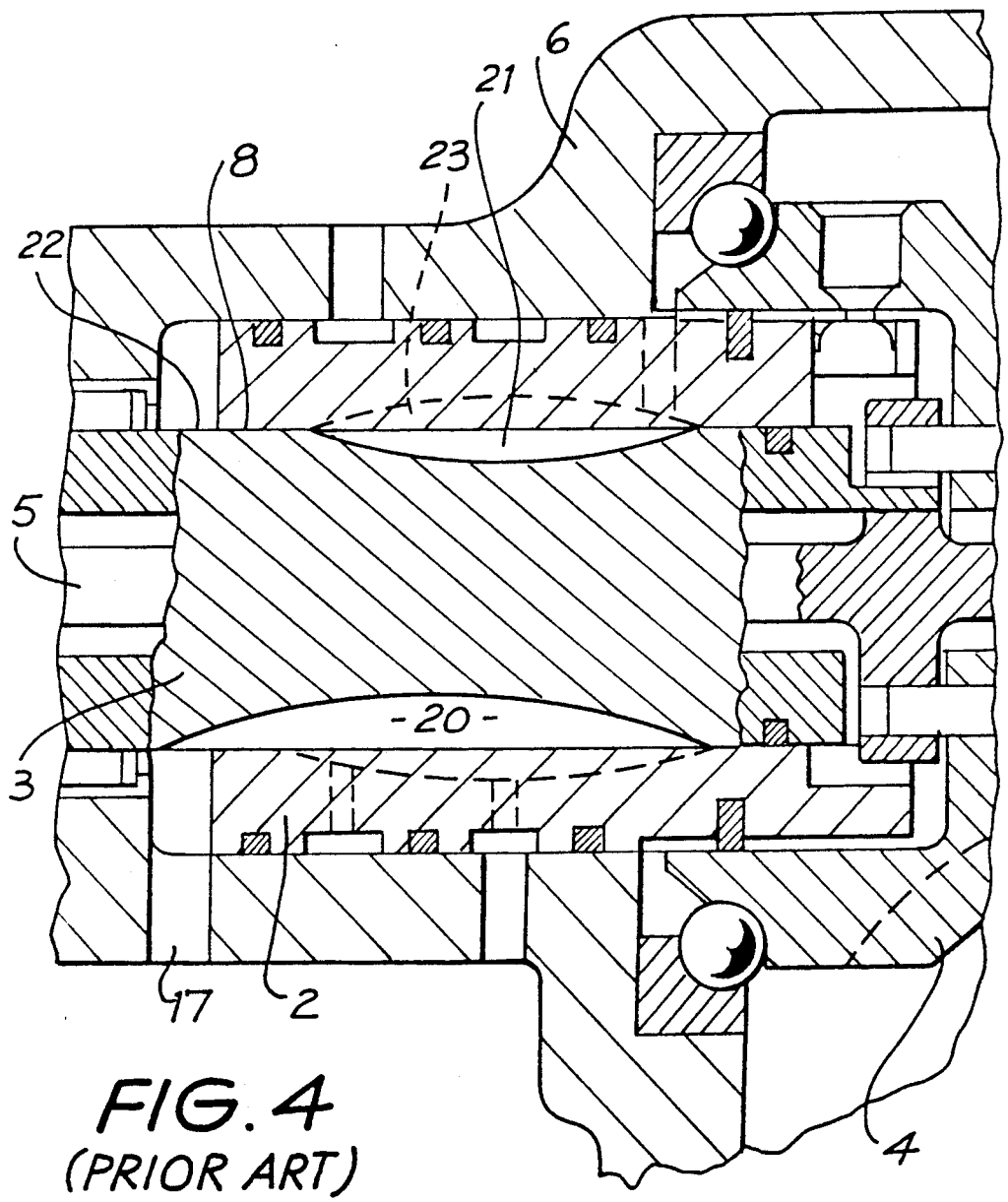
FIG. 4 is a magnification of an equivalent region to that of FIG. 2 but of a valve assembly in accordance with the disclosure of U.S. Pat. No. 3,591,139 (Bishop).

In FIGS. 3 and 4 components corresponding to those in FIGS. 1 and 2, but corresponding to prior art disclosures U.S. Pat. No. 4,454,801 (Spann) and U.S. Pat. No. 3,591,139 (Bishop) are numbered identically so that the constructional differences between the prior art and the embodiment of the present invention can be readily appreciated.

In the case of FIG. 3 it is seen that return slots 10 are rectilinear in form and oil returns axially underneath stop ring 18 via long and narrow cavities 19. As explained earlier, cavities 19 are not intended as an orifice to provide a back pressure on the valve to reduce valve cavitation hiss noises (in fact quite the reverse). However if these cavities were designed sufficiently narrow to generate such back pressure, the orifices would be far too viscosity dependent to provide any appreciable valve hiss reduction at high oil temperatures. This is because these cavities fall into the class of pipe type orifices earlier referred to.

In the case of FIG. 4 oil is returned via extended arcuate slots 20 in input-shaft 3. Non extended arcuate slots 21 communicate to oil feed while blind-ended arcuate slots 23 in sleeve 2 connect to the hydraulic cylinder connections. It is obvious that the method of operation of this rotary valve is quite different to either the embodiment of the present invention or indeed U.S. Pat. No. 4,454,801 (Spann) shown in FIG. 3. FIG. 3 does however clearly show the impracticality of employing extended arcuate return slots in the input-shaft due to the significant loss in torsional strength in this component.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A rotary valve comprising an input-shaft journalled within a sleeve, an array of first and second substantially arcuate slots formed in the internal bore of the sleeve, at least one of said first slots, being stopped short of the ends of the bore, wherein at least one of the second slots extends to at least one axial extremity of the bore to provide an hydraulic fluid return port, each return port being bounded by the periphery of the input-shaft and its associated second slot and being of the form of a sharp edged orifice, and further wherein the associated first and second slots are of substantially the same axial extent in the axial direction remote from said respective return port.

2. A rotary valve as claimed in claim 1 wherein the arcuate slots are in the form of a segment of a circle.

3. A rotary valve as claimed in claim 2 wherein the centres of curvature of the second slots of the array are axially displaced with respect to the centres of curvature of the first slots of the array.

4. A rotary valve as claimed in claim 2 wherein the radii of curvature of the second slots of the array are larger than the radii of curvature of the first slots of the array.

5. A rotary valve as claimed in claim 1 wherein the maximum radial depth of the second slots of the array is larger than the maximum radial depth of the first slots of the array.

6. A rotary valve as claimed in claim 1 wherein the first slots of the array are arranged as feed ports to the valve.

* * * * *